United States Patent
Lin et al.

(10) Patent No.: US 9,904,459 B2
(45) Date of Patent: Feb. 27, 2018

(54) CONTROL DEVICE INTEGRATING TOUCH AND DISPLACEMENT CONTROLS

(71) Applicant: NVIDIA Corporation, Santa Clara, CA (US)

(72) Inventors: Qi Lin, Santa Clara, CA (US); Brian Loiler, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 0 days.

(21) Appl. No.: 14/666,111

(22) Filed: Mar. 23, 2015

(65) Prior Publication Data
US 2016/0283078 A1    Sep. 29, 2016

(51) Int. Cl.
*G06F 3/0488*    (2013.01)
*G06F 3/0338*    (2013.01)
*G05G 9/047*    (2006.01)
*G06F 3/038*    (2013.01)
*G06F 3/0354*    (2013.01)

(52) U.S. Cl.
CPC ........... *G06F 3/0488* (2013.01); *G05G 9/047* (2013.01); *G06F 3/038* (2013.01); *G06F 3/0338* (2013.01); *G06F 3/03547* (2013.01)

(58) Field of Classification Search
CPC ........ G06F 3/041–3/047; G06F 3/0488; G06F 2203/04101–2203/04113
USPC ......... 345/173–178; 178/18.01–18.09, 18.11
See application file for complete search history.

(56) References Cited

U.S. PATENT DOCUMENTS

| | | | |
|---|---|---|---|
| 5,541,622 A * | 7/1996 | Engle | G05G 9/047 345/161 |
| 6,037,930 A | 3/2000 | Wolfe et al. | |
| 6,515,689 B1 | 2/2003 | Terashima | |
| 7,432,908 B2 * | 10/2008 | Rutledge | G06F 3/0338 345/157 |
| 7,580,728 B2 | 8/2009 | Vance et al. | |
| 8,139,031 B2 * | 3/2012 | Calarco | G05G 9/047 345/158 |
| 2003/0214484 A1 | 11/2003 | Haywood | |
| 2004/0019724 A1 | 1/2004 | Singletonk, Jr. et al. | |
| 2004/0119685 A1 | 6/2004 | Harries et al. | |
| 2006/0017709 A1 * | 1/2006 | Okano | G06F 3/0421 345/173 |
| 2006/0250357 A1 | 11/2006 | Safai | |

(Continued)

FOREIGN PATENT DOCUMENTS

GB    2479996    2/2011

*Primary Examiner* — Stephen Sherman (57) ABSTRACT

System and method of controlling an object via control device having integrated touch and displacement control. An embodiment includes an input device having a control stick with an integrated touch sensor, where the control stick may be displaced to provide control of a first functionality of an object, and a user touch sensed by the integrated touch sensor provides control of a second functionality of the object. Additionally, a method is described for controlling an object using a control device integrating displacement and touch control modes. A motion of the object may be controlled, such that inputs from the control device control a relative movement, an absolute movement, and/or a combination of relative and absolute movement for the object. An embodiment includes a game controller having a control device according to the present disclosure.

17 Claims, 7 Drawing Sheets

(56) References Cited

U.S. PATENT DOCUMENTS

| | | |
|---|---|---|
| 2006/0256081 A1* | 11/2006 | Zalewski ............... A63F 13/06 |
| | | 345/156 |
| 2007/0070914 A1 | 3/2007 | Abigail |
| 2007/0075965 A1 | 4/2007 | Huppi et al. |
| 2007/0174531 A1 | 7/2007 | Liberty |
| 2008/0211780 A1 | 9/2008 | Bell et al. |
| 2009/0042649 A1 | 2/2009 | Hsieh et al. |
| 2009/0048021 A1 | 2/2009 | Lian et al. |
| 2009/0228868 A1 | 9/2009 | Drukman et al. |
| 2010/0005196 A1 | 1/2010 | Wolff-Peterson |
| 2010/0033127 A1 | 2/2010 | Griffin, Jr. et al. |
| 2010/0309116 A1 | 12/2010 | Oh |
| 2011/0128239 A1* | 6/2011 | Polyakov ............... G06F 3/016 |
| | | 345/173 |
| 2011/0227823 A1 | 9/2011 | Kim et al. |
| 2013/0100021 A1* | 4/2013 | Larsen ................ A63F 13/214 |
| | | 345/161 |
| 2014/0105136 A1 | 4/2014 | Tellado et al. |
| 2016/0147310 A1* | 5/2016 | Pate ...................... G06F 3/021 |
| | | 345/168 |

\* cited by examiner

CONTROL DEVICE INTEGRATING TOUCH AND DISPLACEMENT CONTROLS

FIELD OF THE INVENTION

The present disclosure relates generally to the field of control of graphics/animation and objects, and more specifically, to the field of input devices for the control of graphics/animation and objects.

BACKGROUND OF THE INVENTION

Joysticks may be used as an input means for a wide variety of control devices. Conventionally, a joystick is mounted in or on a user input or control device in such a way as to allow movement of the joystick, where the joystick movement is interpreted by the control device as a command regarding a controlled object, e.g., in a game application. The object may be a physical object, such as a remote controlled car or plane, or a graphical representation of an object, such as a cursor on a computer display.

Typically, the movement of the joystick is a physical displacement or a deflection away from a center, or resting, position. The displacement of the joystick is registered by the control device, which executes a function with regard to the controlled object according to the input indicated by the joystick position. Often the joystick controls a motion of the object, specifically, a velocity of the object. The direction of the joystick deflection from the center position indicates a commanded direction of motion for the object, while the magnitude (e.g., angle of deflection) controls the rate at which the object is commanded to move.

Conventionally, a joystick includes one or more springs that operate to return the joystick to its resting position when the joystick is released from a deflected position. However, due to friction forces within the control device, the joystick may not consistently return to a centered, or rest, position—or it may do so only after a substantial passage of time. This can make it unclear if a small deflection of the joystick from the center position is due to friction forces preventing the joystick from returning to the center, or if instead a user is purposefully causing the small deflection in the joystick position. For this reason, a region around the center position is often designated wherein a deflection of the joystick is ignored, a so-called "dead band," which establishes a threshold joystick deflection necessary to register with the control device and to control an object. Further, the joystick input may be limited to only one function regarding the controlled object.

Another disadvantage of a conventional joystick is that it is basically a relative position control interface and sometimes the user needs an absolute position control interface.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the present disclosure include a system and method of controlling an object via a control device having integrated touch and displacement control elements. An embodiment includes a user input device having a control stick with an integrated touch sensor, where the control stick may be displaced to provide control of a first functionality of an object, and a user touch sensed by the integrated touch sensor provides control of a second functionality of the object, where the object may be an animated object under software control of a gameplay application. Additionally, a method is described for controlling an object using a control device integrating displacement and touch control modes. A motion of the object may be controlled, such that inputs from the control device control a relative movement, an absolute movement, and/or a combination of relative and absolute movements for the object. An embodiment includes a game controller having a control device according to the present disclosure.

More specifically, an aspect of the present disclosure provides an input apparatus for controlling an animated or otherwise software-controlled object. The input apparatus includes a control device that is configured to control a first object function, based on a displacement of the control device. The input apparatus further includes a touch sensor located on a surface of the control device, where the touch sensor is configured to receive a user touch input, and to provide signals for recording a beginning and ending of a continuous user interaction with the control device. The input apparatus further includes a touch sensor controller that is in electrical communication with the touch sensor, and is configured to control a second object function based on a received user touch input.

According to another aspect of the present disclosure, a method for object motion control is provided. The method includes receiving, at a computer processor, an input signal from a control device. The control device is able to be displaced, and includes a touch sensor that is able to sense a touch of a user. The touch sensor may be located on a surface of, or within, the control device. The input signal is able to be generated via a user-displacement of the control device, via receiving a touch at the touch sensor, or a combination of those interactions. The method further includes determining, by the computer processor, a movement of an object based on a control device configuration and the input signal, wherein the displacing the control device controls a first motion aspect of the object, and wherein the receiving the touch at the touch sensor controls a second motion aspect of the object. The method further includes causing, by the computer processor, the determined movement of the object.

According to yet another aspect of the present disclosure, a game controller is provided. The game controller includes a housing, a processor, and a memory that is able to store a game controller configuration, and to communicate with the processor. The game controller further includes a control device located within the housing, which is able to communicate with the processor. The control device is configured for displacement, and includes a touch sensor located on a surface of the control device. The touch sensor is able to communicate with the processor, and is configured to sense a user touch. The game controller is able to generate an input via a displacement of the control device, a touch sensed by the touch sensor, or a combination thereof, which, along with game controller configuration, cause the processor to perform a game controller function.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

Embodiments of the present invention will be better understood from a reading of the following detailed description, taken in conjunction with the accompanying drawing figures in which like reference characters designate like elements and in which.

DETAILED DESCRIPTION OF THE INVENTION

Embodiments according to the present disclosure provide an input apparatus having a novel control input device that includes a displacement input modality, and the control device further integrates touch sense to provide a touch input modality at the control device. The control device according to the present disclosure provides a capability of several modes of operation within one unit—e.g., relative movement, absolute movement, and a combination of those. The input apparatus may be, for example, a game controller, and the control device may be an analog stick that is able to control a first functionality of a controlled object via a displacement input, and a second functionality of the controlled object via a touch input.

A conventional analog stick (or "joystick") provides input for controlling movement relative to current position, but is not well suited for accurate absolute position information—as is typically provided via a mouse or touch pad on laptop—because the joystick always needs to return to the center position. An aspect of the present disclosure provides a game controller analog stick with the ability to track accurate position information in a similar fashion to mouse or touch pad on a laptop, the position information is commonly not available using conventional analog sticks for a game controller found in the market today. This absolute position information is valuable for certain types of object control and gameplay, which require accurate absolute position of effects or articles found within game. For example, a sniper mode is a game function found within certain games, which requires accurate absolute position in order for a user of the game controller to interact with objects within the game effectively.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed description which follows are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer generated step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present claimed subject matter, discussions utilizing terms such as "storing," "creating," "protecting," "receiving," "encrypting," "decrypting," "destroying," or the like, refer to the action and processes of a computer system or integrated circuit, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "processing" or "accessing" or "executing" or "storing" or "rendering" or the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Control Input Integrating Displacement and Touch

Figure 1:
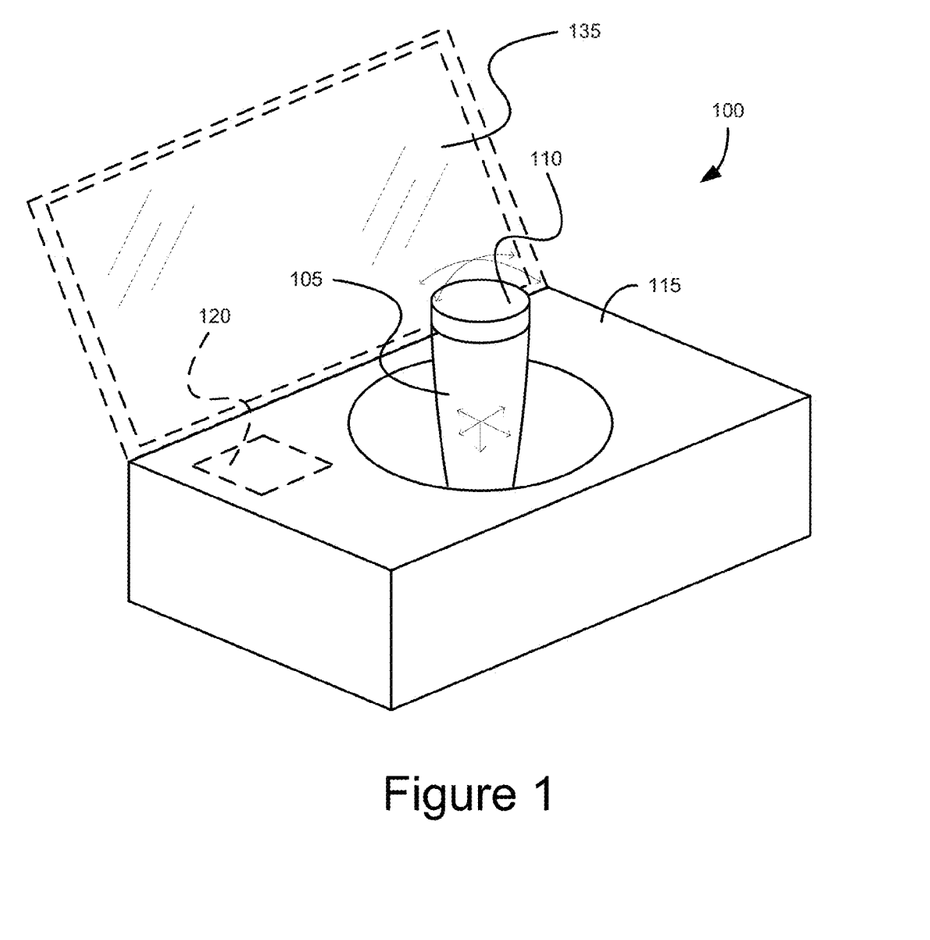
FIG. 1 illustrates an exemplary user input device including a control device or "joystick" that also integrates a touch sensor in accordance with an embodiment of the present disclosure.

FIG. 1 depicts an input apparatus 100 according to an embodiment of the present disclosure. Input apparatus 100 includes a user input or control device 105 integrating a touch sensor element 110. Input apparatus 100 has a housing 115, such that the control device 105 is supported by the housing 115, and is configured for displacement relative to the housing 115. The touch sensor 110 is communicatively coupled to a touch sensor controller 120. The touch sensor controller 120 may be comprised within the housing 115, or alternatively, within the body of the control device 105.

In an embodiment the control device 105 is a control stick, e.g., a joystick functionality, which is configured for translational displacement with respect to the housing 115. In an embodiment the control device 105 is an analog stick, which is mounted within the housing 115 such that the analog stick may be displaced via a deflection away from a rest or center-located position. In an embodiment the control device 105 is a trackball, which is mounted within the housing 115 such that the trackball may be deflected (e.g., rolled) within the housing 115. The control device 105 may be supported within the housing 115 on a gimbal mechanism, or other mechanisms known in the art allowing for translational and/or deflection movements. The control device 105 may have one or more degrees of freedom, which may apply to rotation and/or translation. The control device 105 includes position sensors or transducers, for each degree of freedom, to detect and measure displacements of the control device 105. These position sensors or transducers may generate a signal which can be interpreted to indicate a direction and magnitude of displacement for the control device 105. In an embodiment, the control device 105 includes a set of springs which are mounted within the housing 115, where the set of springs function to exert a restorative spring force to return the control device 105 to the rest position following a displacement and release of the control device 105. The control device 105 may also be capable of being depressed downward, like a push button, and of returning to a rest position. The control device 105 may comprise a top hat, and may include one or more buttons.

The touch sensor 110 includes a touch-sensing mechanism, which may be based on capacitive, resistive, optical, mechanical, pressure, inductive, or any other measurements known to one skilled in the art to be capable of detecting a user touch event at or in proximity to the touch sensor 110. The touch sensor 110 may be positioned within the body of the control device 105, near any surface. In an embodiment the touch sensor 110 is embedded within a top hat of control device 105. The touch sensor 110 is electrically connected with the touch sensor controller 120. The touch sensor 110 is able to communicate a detected user touch to the touch sensor controller 120, which is operable to interpret the user touch as a touch input. Examples of touch input include a contact input such as tapping, or pressing, as well as moving inputs such as sliding, rotating, and bringing a user finger or other object into proximity to the touch sensor 110. Other forms of touch input are possible and are consistent with embodiments according to the present disclosure.

The touch sensor 110 may comprise a detection array operating according to the particular principle of touch detection (e.g., an array of capacitance-sensing wires, or a bundle of optical fibers), which can be arranged in such a manner as to determine a location of a user touch on the touch sensor 110. For example, for a capacitive sensor, a user touch changes a capacitance measurement at a location or region of the array near the user touch, relative to capacitance measurement values at other locations of the array. The change in capacitance caused by the user touch can be detected by the user touch sensor 110, which, due to the arrangement of its measurement elements (e.g., in an array), is able to detect both the presence and the location of the user touch. Likewise, a change in user touch location on the sensor (e.g., via swiping) causes a change in capacitance at a different region of the array, which can be used to map a movement path of the user touch.

The touch sensor controller 120 is operable to receive a detected touch measurement signal from the touch sensor 110 and to determine a position, motion, or combination thereof for a touch detected at or in proximity to touch sensor 110. The touch sensor controller 120 is able to send a signal to a controlled device, where the signal controls a function of the controlled device according to the detected touch at the touch sensor 110. According to an embodiment the signal corresponds to a continuous user interaction with the control device 105, that is, the signal corresponds to a beginning of a user touch through an ending of the user touch at the control device 105.

In an embodiment according to the present disclosure the input apparatus 100 comprises a game controller, and may include an optional graphics display 135. The graphics display may display a rendered object which is able to be controlled by the control device 105 and the touch sensor 110 of the game controller. The game controller, or any input apparatus according to the present disclosure, may comprise one or more control devices 105, each of which may be configured for displacement as well as integrated touch sense via touch sensor 110.

Exemplary Computing System

Figure 2:
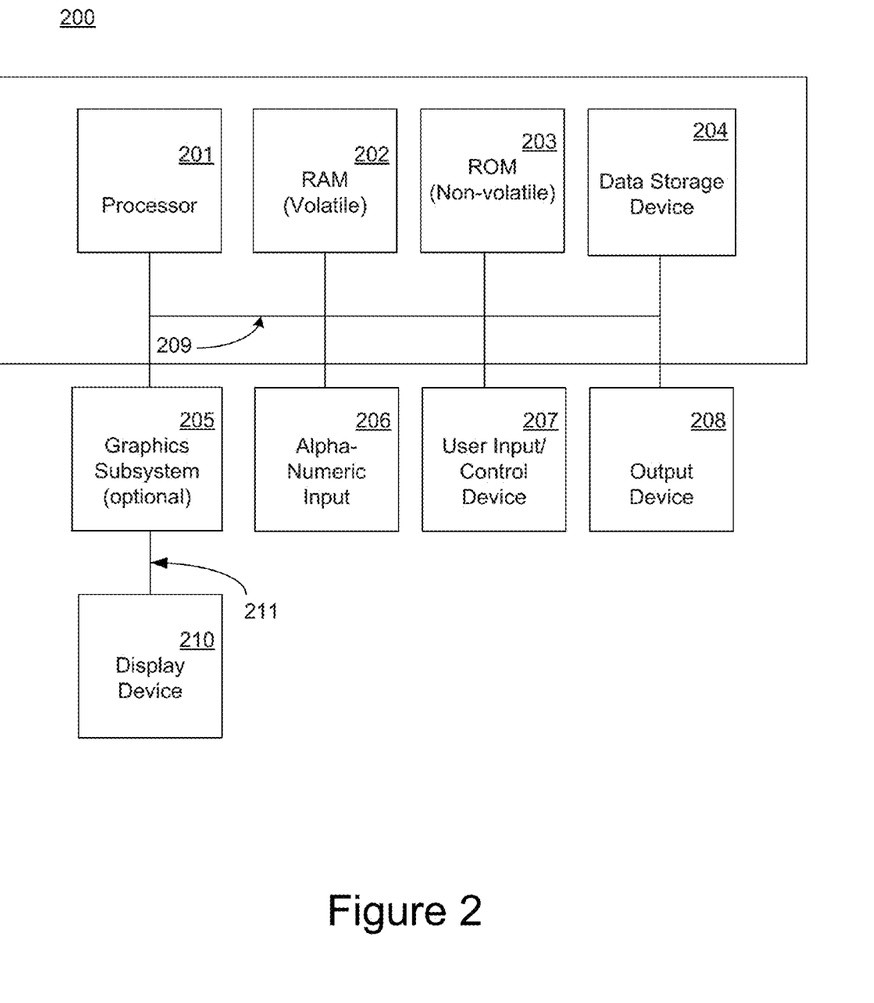
FIG. 2 shows an exemplary computer system including an exemplary user input device in accordance with an embodiment of the present invention.

As presented in FIG. 2, a generalized or alternate system for implementing embodiments includes a general purpose computing system environment, such as computing system 200. In its most basic configuration, computing system 200 typically includes at least one processing unit 201 and memory, and an address/data bus 209 (or other interface) for communicating information. The processor 201 may comprise one or more application-specific integrated circuits (ASICs) or field programmable gate arrays (FPGAs) that are persistently programmed to perform control operations, e.g., for computing system 200 or input apparatus 100, according embodiments of the present disclosure, or may include one or more general purpose hardware processors programmed to perform the control operations pursuant to program instructions in firmware, memory, other storage, or a combination. Such special-purpose computing devices may also combine custom hard-wired logic, ASICs, or FPGAs with custom programming to accomplish the control operations. Depending on the exact configuration and type of computing system environment, memory may be volatile (such as RAM 202), non-volatile (such as ROM 203, flash memory, etc.) or some combination of the two. The memory may store a configuration of an input device, e.g., the input apparatus 100, where the configuration is used to determine a mode of operation for the control device 105 and the touch sensor 110 (e.g., control of an object movement mode, control of an object function, etc.). Computer system 200 may also comprise one or more graphics subsystems 205 for presenting information to the computer user, e.g., by displaying information on attached display devices 210.

Additionally, computing system 200 may also have additional features/functionality. For example, computing system 200 may also include additional storage (removable and/or non-removable) including, but not limited to, magnetic or optical disks or tape. Such additional storage is illustrated in FIG. 2 by data storage device 204. Computer storage media includes volatile and nonvolatile, removable and non-removable media implemented in any method or technology for storage of information such as computer readable instructions, data structures, program modules or other data. RAM 202, ROM 203, and data storage device 204 are all examples of computer storage media.

Computer system 200 comprises a user input or control device 207 for controlling an animated or otherwise software-controlled object. The user input device 207 may include a control stick that is configured to control a first object function, based on a displacement of the control stick. The user input device 207 further includes a touch sensor located on a surface of the control stick, where the touch sensor is configured to receive a user touch input. The user input device 207 may be integrally comprised by the computer system, e.g., such as in a handheld gaming system, or may be separately housed from the computing system, e.g., a controller connected to the computer system 200. Computer system 200 also comprises an optional alphanumeric input device 206, and one or more signal communication interfaces (input/output devices, e.g., a network interface card) 208. Optional alphanumeric input device 206 can communicate information and command selections to central processor 201. Optional cursor control or directing device 207 is coupled to bus 209 for communicating user input information and command selections to central processor 201. Signal communication interface (input/output device) 208, which is also coupled to bus 209, can be a serial port. Communication interface 209 may also include wireless communication mechanisms. Using communication interface 209, computer system 200 can be communicatively coupled to other computer systems over a communication network such as the Internet or an intranet (e.g., a local area network), or can receive data (e.g., a digital television signal).

Figure 3:
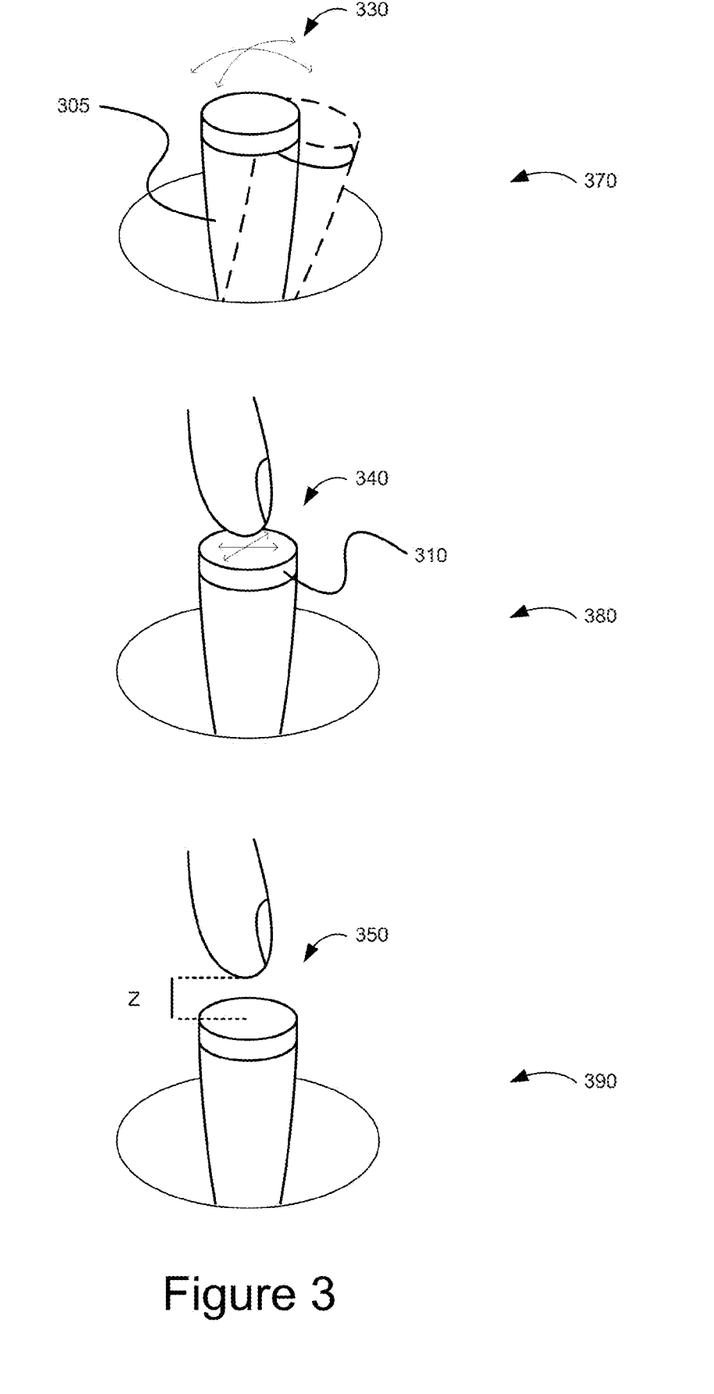
FIG. 3 illustrates exemplary input modes for a control device of an input device, in accordance with an embodiment of the present disclosure.

FIG. 3 illustrates exemplary input modes 370-390 for a control of an input device, in accordance with an embodiment of the present disclosure. The control may be embodied by, for example, a control stick, an analog stick, a trackball, and other control devices known to one of skill in the art. While in the following the control is referred to as a "control stick," it should be understood that other control devices, e.g., a trackball, are consistent with the spirit and scope of the present disclosure. The input device (e.g., input apparatus 100) may be used to control, for example, a physical object or an object depicted on a graphical display. A control stick 305 is configured for displacement, and includes a touch sensor 310 housed within the body of the control stick 305. The touch sensor 310 may be located near a surface of control stick 305. In an embodiment the touch sensor 310 is disposed within a top hat comprised by control stick 305. As shown in input mode 370, a control device 305 (for example, an analog stick) is moved from a rest position with a displacement 330. The displacement 330 may be along any degree of freedom in which the control device 305 is adapted to move, for instance, via a translation or an angular deflection in the x-, y-, or z-plane. In an embodiment, deflection information is provided to the input apparatus 100, or to another controlling system in communication with the control device regarding a position of the control stick 305 relative to a rest, or normal position. This information may be referred to as "relative" information, as it encapsulates the displacement 330 of the control stick 305 relative to a rest position (e.g., how far off-center the control stick 305 is moved). The displacement 330 information is typically updated at a constant rate. In this manner the control stick 305 is able to provide steady feedback regarding the precise direction and magnitude of deflection, which may be used to control a function of an object, for example, to control the velocity of the object.

A user touch 340 may be detected by a touch sensor 310, as depicted by input mode 380. The touch sensor 310 may be a touch sensor 110 as in input apparatus 100 described in FIG. 1, and may detect the user touch 340 through one or more touch-sensing means as described above. The user touch 340 may be a tap, a press, a sliding motion, a rotating motion, and/or bringing a user finger or other object into proximity to the touch sensor 310. Input mode 380 may be used by an input apparatus simply to detect the presence of a user touch. Additionally or alternatively, input mode 380 may provide an input signal which is used to control a function of an object. In an embodiment, the touch sensor 310 logs a first contact (e.g., a user touch 340), any user movement following the initial touch location, and a release point. In an embodiment, the touch sensor 310 logs the location of initial user touch 340 at the touch sensor 310, and then the change in position of the user touch 340 with user movement via logging a sample of points along a movement path described by the user touch 340. For a touch sensor 310 configured to control a motion of an object, for example, the user movement (e.g., change in position of user touch) along the touch sensor 310 may be used to control a movement of the object (e.g., control a change in object absolute position).

Input mode 390 illustrates touch sensor 310 detecting a user proximity 350 relative to the touch sensor 310. As shown in FIG. 3, user proximity 350 may be a z-height of a user finger above a top surface of touch sensor 310. Alternatively, a user may make contact with the touch sensor 310, and user proximity 350 may be measured by a surface area of the user contact with the touch sensor 310. For example, for a capacitance-based touch sensor an increase (or decrease) in user surface area may be measured by an overall change in capacitance measured at the sensor, or by capacitance sensed over an increasing (or decreasing) region of a touch sensor array. In an alternative embodiment, touch sensor 310 comprises an array of optical fibers, and user proximity 350 is detected according to an amount of light received or deflected at optical fibers comprised by the array. Detection of user proximity 350 enables control of a greater number of functions of an object. For example, one function for user proximity 350 may be for a game controller used to control a flying character in a game, where user proximity 350 is able to control a vertical motion of the character while other inputs (e.g., control stick 305 displacement) may control motion in other planes. In an embodiment, a user contact moving off the touch sensor 310, or pushing down on the touch sensor 310, detected as user proximity 350, enables vertical movement control of an object.

According to an embodiment, an input device including a trackball 305 may be configured to operate in "relative" mode, that is, as a conventional analog stick operates. In this mode, the touch sensor 310 is operable to detect an initial point of contact on a surface of the trackball 305, this initial point of contact defining a "rest position" for the trackball analogous to the rest position of a conventional analog stick. Thereafter, movement of the trackball away from this rest position is interpreted by the input device as a deflection from the rest position, and may be used to control an object via relative movement. That is, the larger the deflection (increasing angle the trackball is rolled) from the initial point of contact, the greater the rate of displacement of the controlled object. The trackball 305 may also be configured to operate in absolute (position) mode, or in acceleration mode. In absolute mode, the trackball 305 operates generally as a conventional trackball, wherein a controlled movement of an object corresponds to the magnitude of a deflected (e.g., rolled) movement of the trackball. In acceleration mode, the trackball 305 is configured similarly as for the relative mode, however, the deflection of the trackball is interpreted to control a rate of movement of the object away from the detected rest position of the trackball 305.

The input device 100 may include actuators for providing haptic feedback to a user of the input device 100. The haptic feedback may correspond to a cessation of a user touch at the trackball 305, that is, the touch sensor 310 detects a continuous user touch at the trackball 305, and at the ending of the user touch the input device 100 is able to cause actuators of the input device to vibrate in order to provide haptic feedback to the user of the input device 100.

Functionality Control Via Integrated Displacement and Touch Control

Several aspects of controlling an object via a displacement modality and a touch sense modality are described above. An advantage provided by embodiments of the present disclosure is a control device incorporating both control modalities by one device, e.g., an analog stick that may be displaced and, additionally or alternatively, sense a user touch at a surface of the analog stick. Such an arrangement provides enhanced control of object functions, as well as enabling novel methods of object control, as described herein.

As described herein, one limitation of a conventional control stick (e.g., a joystick) is the difficulty for an input system to determine if a small displacement (e.g., deflection) of the joystick is due to a deliberate user input, or rather to friction forces overcoming restorative spring forces internal to the joystick and which are configured to return the joystick to a rest position following a displacement and release by a user. It is in view of this difficulty that an input system implementing a conventional joystick for control typically incorporates a so-called "dead band," e.g., a region near the resting position of the joystick wherein a displacement of the joystick is ignored. This region effectively establishes a minimum threshold necessary for the input system to register a joystick displacement, thereby limiting the precision and fine control capabilities of a conventional joystick.

Figure 4:
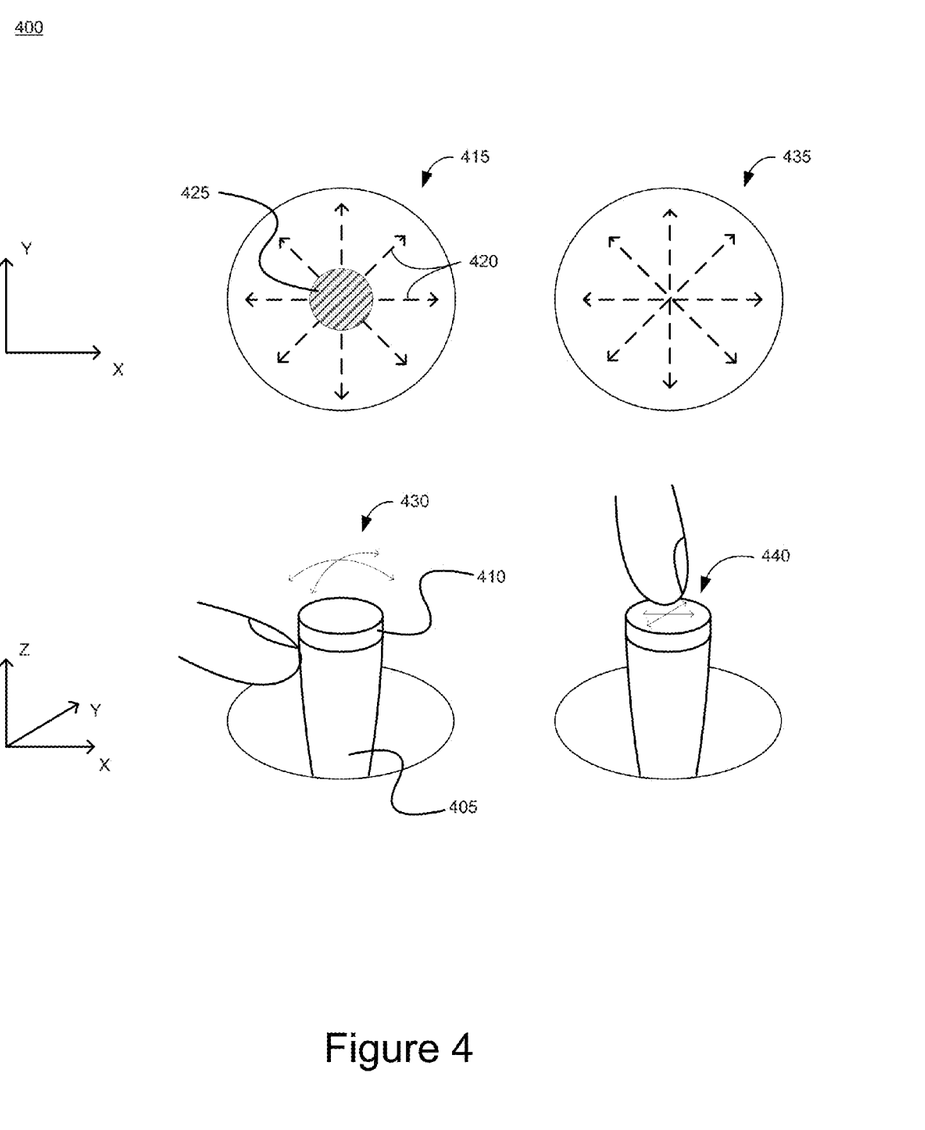
FIG. 4 depicts top and side views of a user input device illustrating an exemplary input functionality for a control device according to an embodiment of the present disclosure.

Embodiments of the present disclosure provide solutions that obviate the need to implement a dead band for a displacement-based control device, by disambiguating a small deflection of the control device caused by a user from a small deflection caused by the control device failing to return to a rest position following release from a displaced position. FIG. 4 depicts top and side views 400 of an input device and input region illustrating an exemplary input functionality for a control stick 405, according to an embodiment of the present disclosure. In the top view, illustrated by the x-y axis, control device input regions 415 and 435 are shown. Control device input regions 415 and 435 correspond to an input region within which a control device 405 may be manipulated by a user. For example, the control device 405 may be an analog stick, and a displacement 430 of the control device 405 may be an angular deflection away from an upright resting position. As shown in FIG. 4 by elements 420, control device 405 may be displaced along one or more degrees of freedom, where the displacement may be a translation, an angular deflection, or a rotation of control device 405. According to embodiments of the present disclosure, control device 405 integrates a touch sensor 410, which is able to sense a user touch and is located within control device 405 such that the touch sensor 410 is able to sense a user touch at a surface of control device 405.

According to an embodiment of the present disclosure, an input device (e.g., input device 100) may be configured to implement a dead band 425, within which a displacement 430 of the control device 405 is ignored. This configuration is shown by input region 415. In one embodiment, the displacement 430 within the dead band 425 does not cause the control device 405 to generate a signal indicating displacement. In one embodiment, the control device 405 generates a signal indicating displacement, but the signal is not used by the input device to control any functionality of an object whilst the control device 405 remains in the dead band 425.

According to an embodiment of the present disclosure, the input device may be configured to recognize when a user is touching the control device 405, and may remove the dead band 425 at such times, as is illustrated in FIG. 4 by input region 435. The control device 405 incorporating touch sensor 410 may detect a user touch 440. The user touch 440 may be a simple light touch of the skin of the user to the touch sensor (e.g., a finger touch), or may be a press, a swipe, and/or other modes of contact and interaction between a user and the control device 405 at the touch sensor 410. The user touch 440 is able to be used to determine a user interaction with the control device 405, which may be a displacement of control device 405, an interaction with touch sensor 410, and/or a combination of these.

Touch sensor 410 integration with control device 405 enables the input device to differentiate a situation when a user has displaced the control device 405 slightly off-center, and desires the control device 405 to be off-center, from a situation when the user is slightly off-center but intends for the control device 405 to be back at center. This enables improved precision of the control system, in that even small deflections may be detected and used to control an object, whereas such small deflections are ignored within the dead band of a conventional joystick input system. Likewise, touch sensor 410 is able to detect when a user releases control device 405, and in an embodiment the input device may be configured to consider the released control device 405 to be returned to the resting position, even if the control device 405 is positioned with a small displacement. In this manner the dead band may be rendered wholly unnecessary, as the control device 405 may be configured to sense a user interaction and when the user releases the control device, both via touch sensor 410, and thereby removing the ambiguity regarding the cause of a small control device displacement from a rest position.

Figure 5:
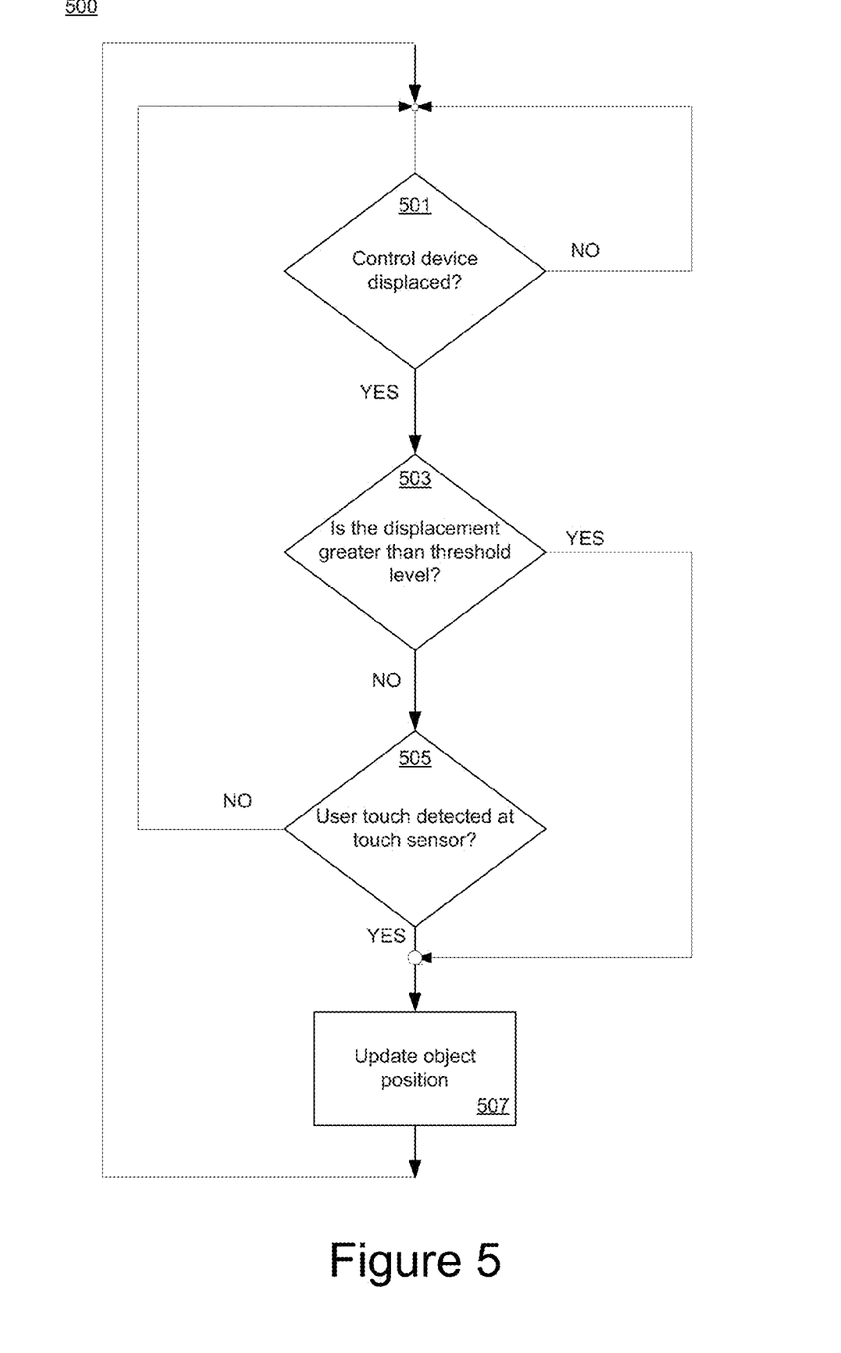
FIG. 5 is a flowchart illustrating an exemplary control input process in accordance with an embodiment of the present disclosure.

FIG. 5 is a flowchart illustrating an exemplary computer-implemented control input process 500 for determining an update of a function of a controlled object, according to an embodiment of the present disclosure. Process 500 may be implemented using an input apparatus according to the present disclosure, e.g., by input apparatus 500 of FIG. 1. Alternatively, process 500 may be implemented by a computing device in communication with an input apparatus according to the present disclosure, e.g., computing system 200 with user input 207, where the input device 207 is able to communicate with the processor 201 in order to control one or more objects provided by the computing device 200. In one embodiment, process 500 determines if a control device displacement is within a dead band region, and if so, determines if a user touch is detected. The detected user touch functions to nullify the dead band, such that the control device displacement is not ignored and the function of the controlled object is updated accordingly.

Control input process 500 begins at step 501, where a determination is made regarding whether or not a control device (e.g., control device 105 comprised by input apparatus 100) is displaced. A control device displacement may be a translation, a deflection, and/or a rotation in any degree of freedom within which the control device is configured to move. If the control device is not displaced, the process returns to the beginning. If the control device is displaced, the process proceeds to step 503.

At step 503 a determination is made regarding whether or not the control device displacement is in excess of a threshold level. The threshold level may be defined by a dead band, as described herein. A displacement of larger magnitude than the threshold level directs the process to step 507, while a displacement smaller than the threshold directs the process to step 505.

At step 505 a determination is made regarding if a user touch is detected at a touch sensor comprised by the control device (e.g., touch sensor 110). A detected user touch directs the process to step 507, while a lack of detected user touch returns the process to the beginning.

At step 507 an object controlled by the input apparatus has a function updated according to the indication received from the control device, the touch sensor, or a combination thereof. For example, the function may be a motion of the object, and the control device may update a relative movement rate of the object (e.g., a velocity or an acceleration), while the touch sensor may update an absolute position of the object. The function of the control device and of the touch sensor may be determined according to a control device configuration.

Figure 6:
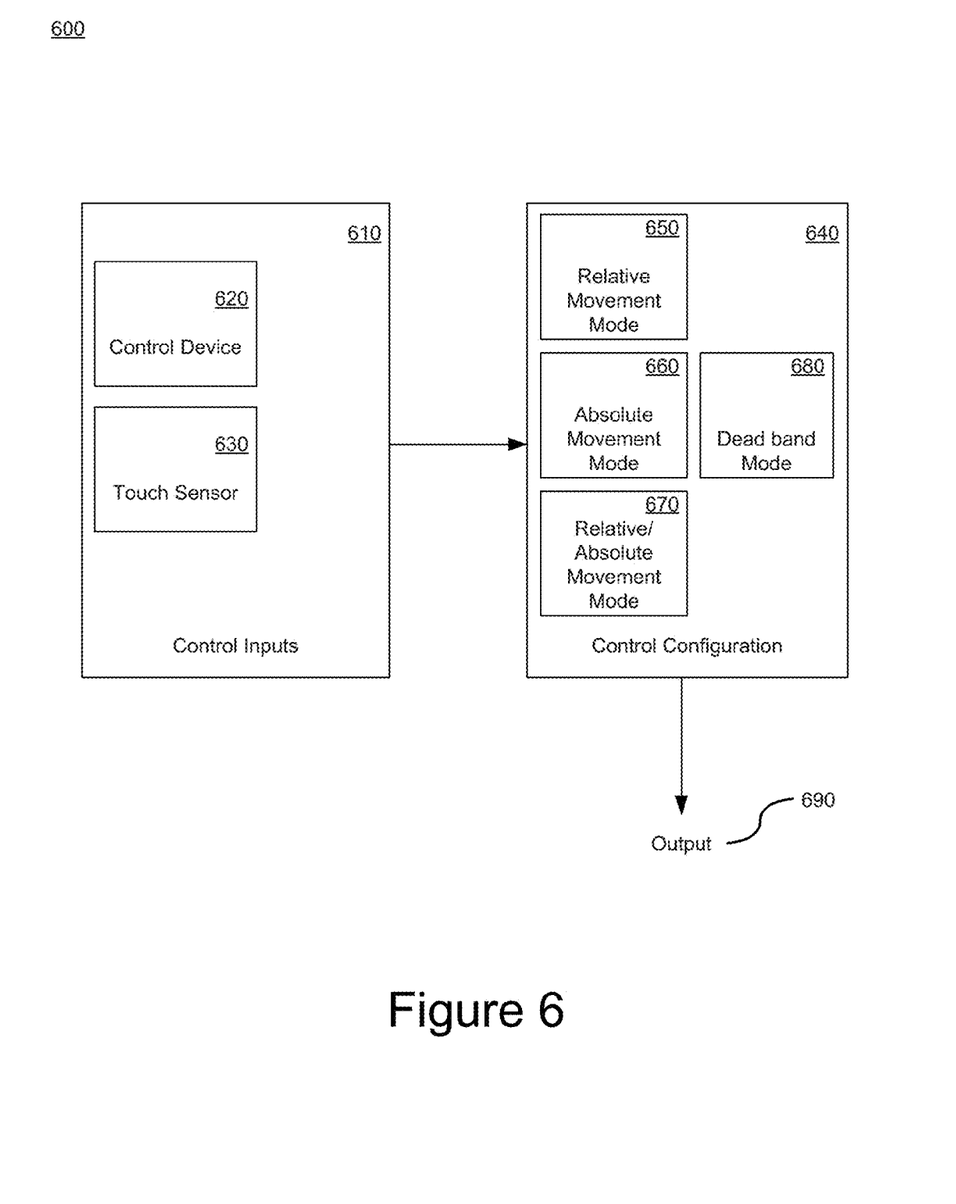
FIG. 6 is a block diagram illustrating an exemplary control design in accordance with an embodiment of the present disclosure.

FIG. 6 is a block diagram illustrating an exemplary control design 600 including control inputs 610 and control configuration 640, in accordance with an embodiment of the present disclosure. According to embodiments of the present disclosure, an input apparatus comprises a control device configured for displacement, and the control device integrates a touch sensor configured to detect a user touch at a surface of the control device. In an exemplary embodiment the input apparatus (e.g., input apparatus 100) is a game controller, the control device is an analog stick, and the touch sensor is embedded in a top hat comprised by the analog stick. The functions controlled by control device displacement, and by sensed touch, may be configured according to a desired use of the input apparatus when interacting with an object configured for control by the input apparatus.

Control inputs 610 include control device input 620 and touch sensor input 630. Control inputs 610 and 620 correspond to a displacement of the control device and a touch sensed at the touch sensor, respectively. Modes of control device displacement and sensed touch are described herein above, and for brevity, are not repeated here. A configuration 640 for the input apparatus may be stored at a memory comprised by the input apparatus (e.g., memory 202 and/or 203), or alternatively, at a memory comprised by a computing system with which the input apparatus communicates in order to control an object. The configuration serves to determine a mode of operation for the input apparatus, in particular, for the control inputs 610. In one embodiment the configuration 640 comprises a relative mode 650, an absolute mode 660, and a mode including a combination of these 670. The configuration 640 may also include a dead band mode 680. Depending on the selected mode(s) of control configuration 640, control inputs 610 are used to provide an output 690 in order to control a function of a controlled object.

For example, for an input apparatus comprising a game controller, control device input 630 and touch sensor input 630 may be used to control an object rendered on a display 135 of the game controller, or on a display with which the gaming controller communicates, either directly or via a computing device. A movement of the control device causes a control input 620, which is used along with the configured mode of operation to determine the output to the controlled object. For example, if the control configuration has relative movement 650 selected for control device input 620, the control input 620 is used to determine a relative movement of the object, as reflected in output 690. Alternatively, the game controller may be configured for a combination operation mode 670, where the control device input 620 is used to control a relative motion of the object, and the touch sensor input 630 is used to control an absolute motion of the object.

In an embodiment, the configuration of the input apparatus may be changed by a user via one of the control inputs 610, for example, via touch sensor 630. The input apparatus may be configured such that the control device input 620 is used to control a function of an object, such as an object movement, and the touch sensor input 630 may be used to activate and select a configuration mode of the control device input 620. For example, the control device input 620 may be initially configured for velocity control of an object in relative mode 650, and a touch sensor input 630 may be used to change the control device input 620 for acceleration control. Alternatively or additionally, the touch sensor input 630 may be used to change from relative mode 650 to combination mode 670. A change from any initial mode to any other configuration mode suitable for the controlling function being performed is consistent with the spirit and scope of the present disclosure.

In an embodiment, a configuration for a dead band mode 680 is provided for an input apparatus. The dead band mode 680 may determine if the control device is configured to operate with a dead band enabled. In an embodiment, the manner in which a dead band is implemented by the input apparatus is determined according to dead band mode 680, which may include implementations described herein with regard to FIGS. 4-5.

Figure 7:
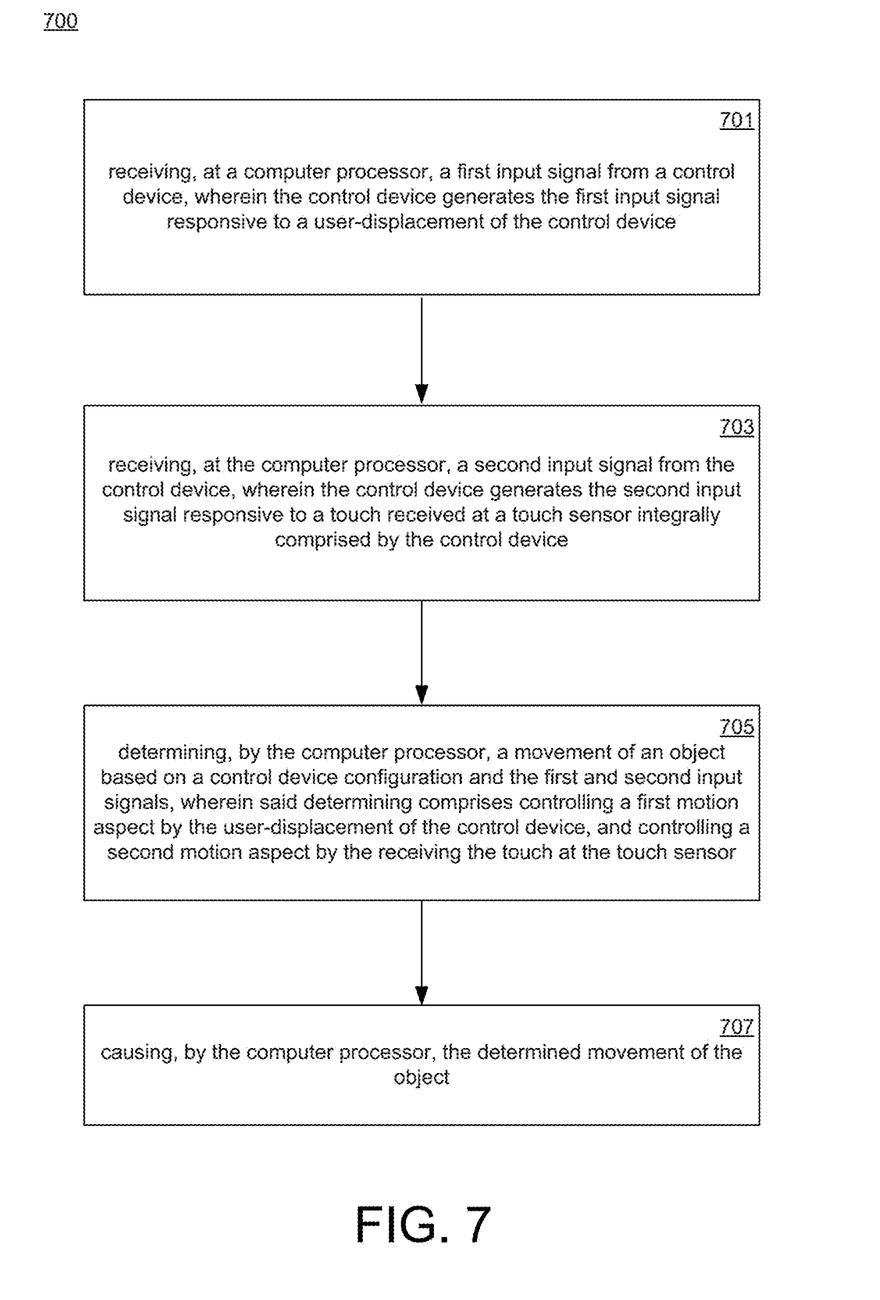
FIG. 7 is a flowchart illustrating an exemplary control device input process in accordance with an embodiment of the present disclosure.

FIG. 7 is a flowchart illustrating an exemplary computer-implemented control device input process 700 in accordance with an embodiment of the present disclosure. Process 700 may be implemented using an input apparatus according to the present disclosure, e.g., by input apparatus 100 of FIG. 1. Alternatively, process 700 may be implemented by a computing device in communication with an input apparatus according to the present disclosure, e.g., computing system 200 with user input 207, where the input device 207 is able to communicate with the processor 201 in order to control one or more objects provided by the computing device 200.

At step 701 a computer processor receives a first input signal from a control device. The control device may be, for example, control device 105 of FIG. 1. The control device generates the first input signal via a user-displacement of the control device. At step 703 the computer processor receives a second input signal, where the second input signal is generated responsive to the control device receiving a touch at a touch sensor integrally comprised by the control device. Modes of displacement of the control device, and of sensing a touch at the touch sensor, have been described herein above and are not repeated here for brevity.

At step 705 the computer processor determines a function control based on a control device configuration and the first and second input signals. The control device configuration may be, for example, control configuration 640, and may be used to select a mode of operation for one or more inputs of the control device. The function control may be any suitable control for the object, for example, the function control may be control of a movement of an object represented on a graphical display. The user-displacement of the control device may control a first motion aspect of the object, and the receiving the touch at the touch sensor may control a second motion aspect of the object. For example, the first motion aspect may be a rate of movement of the object, and the second motion aspect may be an absolute position. The first motion aspect may initially be configured for any one of a position, a rate, and an acceleration movement mode of the object, and the second motion aspect may be used to convert the control of the first motion aspect between the movement modes of the object.

At step 707 the computer processor generates a control output for the object according to the determination at step 705. For example, step 705 comprises determining a motion control of an object, and at step 707 the computer processor causes the object to move in the manner determined at step 705.

In the foregoing detailed description of embodiments of the present invention, numerous specific details have been set forth in order to provide a thorough understanding of the present invention. However, it will be recognized by one of ordinary skill in the art that the present invention is able to be practiced without these specific details. In other instances, well-known methods, procedures, components, and circuits have not been described in detail so as not to unnecessarily obscure aspects of the embodiments of the present invention. Although a method is able to be depicted as a sequence of numbered steps for clarity, the numbering does not necessarily dictate the order of the steps. It should be understood that some of the steps may be skipped, performed in parallel, or performed without the requirement of maintaining a strict order of sequence. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part.

Embodiments according to the present disclosure are thus described. While the present disclosure has been described in particular embodiments, it is intended that the invention shall be limited only to the extent required by the appended claims and the rules and principles of applicable law.

What is claimed is:

1. An input apparatus, the input apparatus comprising:
 a moveable control device configured to provide first signals for control of a first object function based on a user interaction with the control device, wherein the control device has a non-displaced, central rest position and wherein movement of the control device comprises rotation of the control device around the central rest position;
 a touch sensor disposed on a surface of the control device, the touch sensor configured to receive a user touch input; and
 a touch sensor controller in electrical communication with the touch sensor, the touch sensor controller configured to provide second signals for recording a beginning and an ending of a continuous user interaction with the control device, based on the user touch input, wherein the second signals function to convert the first object function from a rate of movement of an object to an absolute position of the object.

2. The input apparatus according to claim 1, wherein the control device comprises a control stick, wherein the touch sensor is disposed on a top surface of the control stick, and further wherein the continuous user interaction comprises an angular deflection of the control stick.

3. The input apparatus according to claim 1, wherein the user touch input is selected from the group consisting of: a user pressure; a user sliding contact motion; and a user proximity.

4. The input apparatus according to claim 1, wherein the control device is configured to vibrate at the ending of the continuous user interaction.

5. The input apparatus according to claim 1, wherein the touch sensor is selected from the group consisting of: a capacitive sensor; a resistive sensor; an optical sensor; and a pressure sensor.

6. The input apparatus according to claim 1, wherein a neutral position is defined for the control device being in a non-displaced rest position, and wherein a dead band region is defined for the control device around the neutral position wherein displacement of the control device within the dead band region does not cause movement of the object except movement of the object occurs with the control device in the dead band region when one of the second signals is received concurrently with the displacement of the control device.

7. The input apparatus according to claim 1, wherein the object comprises a graphical representation displayed on a graphical display.

8. The input apparatus according to claim 1, wherein the user touch input controls a vertical motion of the object.

9. The input apparatus according to claim 1, wherein the touch sensor is operable for detecting a change in a surface area of the user touch input.

10. The input apparatus according to claim 1, wherein the control device and the touch sensor are each communicatively coupled to a processor and to a memory operable to store a game controller configuration, wherein a user input causes the processor to perform a game controller function based upon the user input and the game controller configuration, wherein the user input is selected from the group consisting of: the user interaction with the control device; and the user touch input received by the touch sensor.

11. An input apparatus, the input apparatus comprising:
 a moveable control device configured to provide first signals for control of a first object function based on a user interaction with the control device, wherein the control device has a non-displaced, neutral rest position and wherein movement of the control device comprises movement of the control device around the central rest position;
 a touch sensor disposed on a surface of the control device, the touch sensor configured to sense a user touch input; and
 a touch sensor controller in electrical communication with the touch sensor, the touch sensor controller configured to provide second signals based on the user touch input for recording a beginning and an ending of a continuous user interaction with the control device, wherein a dead band region is defined around the neutral position and wherein the dead band region is removed and is not implemented when and while the touch sensor senses the user touch input.

12. The input apparatus according to claim 11, wherein the user touch input is selected from the group consisting of: a user pressure; a user sliding contact motion; and a user proximity.

13. The input apparatus according to claim 11, wherein the touch sensor is selected from the group consisting of: a capacitive sensor; a resistive sensor; an optical sensor; and a pressure sensor.

14. The input apparatus according to claim 11, wherein the user touch input controls a positional aspect of an object.

15. The input apparatus according to claim 11, wherein the touch sensor is operable for detecting a change in a surface area of the user touch input.

16. The input apparatus according to claim 11, wherein a mode of operation for the control device and for the touch sensor is determined, wherein the user touch input received by the touch sensor controls a selection of the mode of operation, independently, according to the control device configuration and wherein the mode of operation is selected from the group consisting of: a rate of movement; an acceleration; and an absolute position.

17. The input apparatus according to claim 11, wherein the control device and the touch sensor are each communicatively coupled to a processor and to a memory operable to store a game controller configuration, wherein a user input causes the processor to perform a game controller function based upon the user input and the game controller configuration, wherein the user input is selected from the group consisting of: the user interaction with the control device; and the user touch input received by the touch sensor.

* * * * *